United States Patent [19]
Benson et al.

[11] Patent Number: 5,154,911
[45] Date of Patent: * Oct. 13, 1992

[54] EFFICIENT METHOD FOR THE CHEMICAL PRODUCTION OF CHLORINE AND THE SEPARATION OF HYDROGEN CHLORIDE FROM COMPLEX MIXTURES

[75] Inventors: Sidney W. Benson, Los Angeles; Mohamed W. M. Hisham, Oxnard, both of Calif.

[73] Assignee: University of Southern California, Los Angeles, Calif.

[*] Notice: The portion of the term of this patent subsequent to Sep. 25, 2007 has been disclaimed.

[21] Appl. No.: 691,179

[22] Filed: Apr. 24, 1991

Related U.S. Application Data

[63] Continuation of Ser. No. 430,805, Nov. 2, 1989, abandoned.

[51] Int. Cl.$^5$ ............................................. C01B 7/04
[52] U.S. Cl. ..................................................... 423/502
[58] Field of Search .................. 423/502, 504, 507, 500

[56] References Cited

U.S. PATENT DOCUMENTS

| | | | |
|---|---|---|---|
| 359,630 | 5/1889 | Minet et al. | 423/507 |
| 2,204,172 | 6/1940 | Balcar | 423/502 |
| 2,204,733 | 6/1940 | Miller | 423/502 |
| 2,206,399 | 4/1937 | Grosvenor, Jr. et al. | 423/507 |
| 2,271,056 | 1/1942 | Balcar | 423/502 |
| 2,451,870 | 10/1948 | Richardson et al. | 423/502 |
| 2,542,961 | 2/1951 | Johnson et al. | 423/502 |
| 2,577,808 | 12/1951 | Pye et al. | 423/502 |
| 2,602,021 | 7/1952 | Belchetz | 423/502 |
| 3,210,158 | 10/1965 | Engel et al. | 423/502 |
| 3,260,678 | 7/1966 | Engel et al. | 423/502 |
| 3,542,520 | 11/1970 | Borkowski | 423/502 |
| 3,561,923 | 2/1971 | Takakura et al. | 423/502 |
| 4,119,705 | 10/1978 | Riegel et al. | 423/507 |
| 4,803,065 | 2/1989 | Itoh et al. | 423/502 |
| 4,959,202 | 9/1990 | Minet et al. | 423/507 |

FOREIGN PATENT DOCUMENTS

| | | |
|---|---|---|
| 599241 | 1/1961 | Belgium. |
| 1068676 | 10/1957 | Fed. Rep. of Germany ...... 423/502 |

OTHER PUBLICATIONS

K. Yoshida, T. Kiyoura, K. Shikai, T. Mitani, & Y. Tozuka, "Recovery of Chlorine from Hydrogen Chloride–MT–Chlor Process Development," pp. 1–14.

S. Furusaki, "Catalytic Oxidation of Hydrogen Chloride in Fluid Bed Reactor," *A. I. Ch. E. J.* 19, 1009–1015 (1973).

J. Th. Quant, J. van Dam, W. F. Engel & F. Wattimena, "The Shell Chlorine Process," *The Chemical Engineer*, CE224–CE232 (Jul./Aug. 1983).

(List continued on next page.)

Primary Examiner—John Niebling
Assistant Examiner—Brian M. Bolam
Attorney, Agent, or Firm—Poms, Smith, Lande & Rose

[57] ABSTRACT

A process for the efficient production of $Cl_2$ from gaseous HCl, using a catalyst containing a transition metal oxide, an alkali metal chloride, and, optionally, a trivalent rare earth chloride, operates efficiently at moderate temperatures and without volatilization of the catalyst. The process comprises two steps: (1) a chloridizing step in which the HCl is contacted with the catalyst at an elevated temperatures, converting the transition metal oxide to a transition metal chloride with elimination of water; and (2) an oxidizing step in which the transition metal chloride produced in the first step is contacted with a source of oxygen at a temperature at least about 300° C. but less than 400° C. and sufficiently high that $Cl_2$ is evolved and the transition metal chloride is reconverted to a transition metal oxide. The temperature of the oxidizing step is increased over that of the chloridizing step. Preferably, the transition metal oxide is $MnO_2$, in which case the $MnO_2$ is converted to $MnCl_2$ in the first step with the release of $Cl_2$. The transition metal oxide can also be $Co_2O_3$, $Co_3O_4$, $Cr_2O_3$, NiO, $Ni_2O_3$, $Mo_2O_3$, or CuO.

28 Claims, 1 Drawing Sheet

OTHER PUBLICATIONS

C. P. Van Dijk & W. C. Schreiner, "Chlorine Recovery from Hydrogen Chloride," pp. 95–114 (1978).

C. P. Van Dijk & W. C. Schreiner, "Hydrogen Chloride to Chlorine Via the Kel-Chlor Process," *Engin. Prog.* 69, 57–63 (1973).

C. P. Van Dijk & W. C. Schreiner, "The Kel-Chlor Process," *Indus. & Engin. Chem.* 61, 23–26 (1969).

C. P. Van Dijk & W. C. Schreiner, "Chlorine Made in the Modern Style Without Caustic," *Chemical Week*, Apr. 26, 1972, pp. 43–44.

W. C. Schreiner, A. E. Cover, W. D. Hunter, C. P. van Dijk & H. S. Jongenburger, "Oxidize HCl for Chlorine," *Hydrocarbon Processing*, Nov. 1974, pp. 151–156.

W. F. Engel, M. J. Waale & S. Muller, "Recent Developments in the Oxidative Recovery of Chlorine from Hydrochloric Acid," *Chem. & Indus.*, Jan. 13, 1962, pp. 76–83.

F. Molyneux, "Recovery of Chlorine from By-product Hydrochloric Acid," *Chem. & Process Engin.*, Jun. 1962, pp. 267–275.

C. W. Arnold & K. A. Kobe, "Thermodynamics of the Deacon Process," *Chem. Engin. Prog.*, Jun. 1952, pp. 292–295.

J. Gordon, "Wanted: Chlorine Without Caustic," *Chem. Eng.*, May 1953, pp. 187–193.

M. M. Mallikarjunan & S. Z. Hussain, "Oxychlorination of Some Lower Aliphatic Hydrocarbons," *J. Scientific & Indus. Res.* 42, 209–229 (1983).

J. A. Allen, "Energetic Criteria for Oxychlorination Catalysts," *J. Appl. Chem.* 12, 406–412 (1962).

J. A. Allen & A. J. Clark, "The Reaction of Oxygen with Metallic Chlorides," *J. Appl. Chem.* 16, 327–332 (1966).

J. A. Allen & A. J. Clark, "Oxychlorination Catalysts," *Rev. Pure & App. Chem.* 21, 145–166 (1971).

A. M. Jones, H. Bliss & C. A. Walker, "Rates of Hydrogen Chloride Oxidation," *A. I. Ch. E. J.*, Mar. 1966, pp. 260–265.

H. F. Johnstone, "Chlorine Production: Nonelectrolytic Processes," *Chem. Engin. Prog.*, Sep. 1948, pp. 657–668.

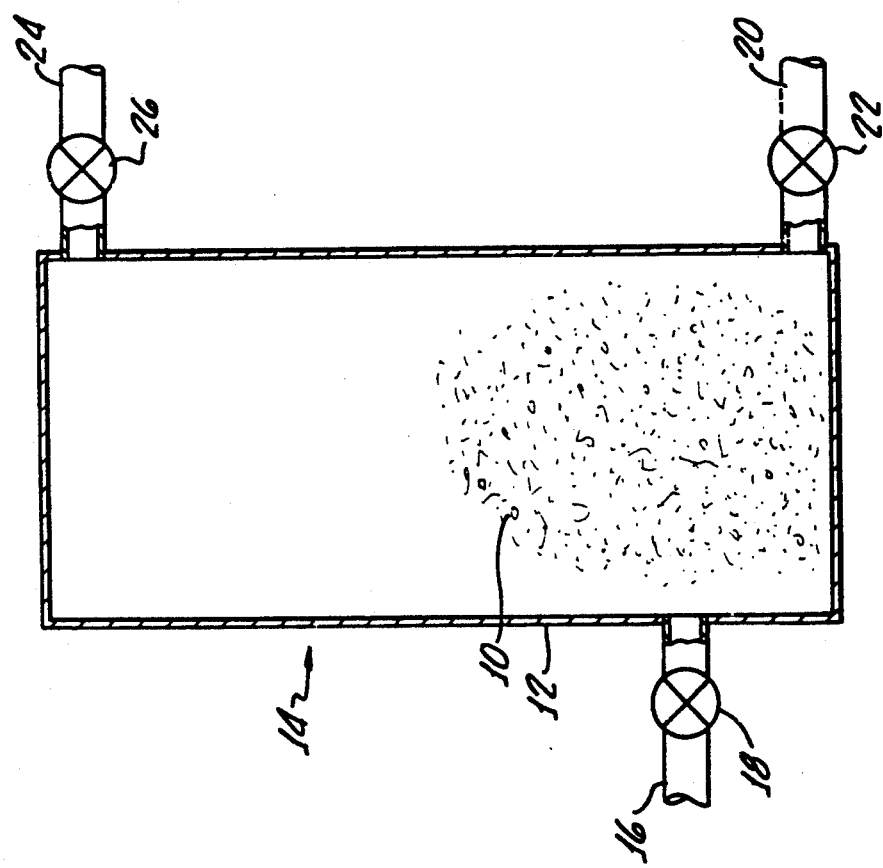

EFFICIENT METHOD FOR THE CHEMICAL PRODUCTION OF CHLORINE AND THE SEPARATION OF HYDROGEN CHLORIDE FROM COMPLEX MIXTURES

This is a continuation of copending application Ser. No. 07/430,805 filed on Nov. 2, 1989, now abandoned.

BACKGROUND

This application relates to improved processes for the chemical production of chlorine from gaseous HCl. The gaseous HCl can be part of a complex mixture.

In recent years increasing amounts of HCl are being obtained as a by-product of several manufacturing processes such as the industrial production of chlorinated hydrocarbons. At the same time industrial demand for gaseous chlorine has also greatly increased. As a result there is a great need for more efficient chemical processes for producing chlorine from hydrogen chloride, especially processes capable of large-scale industrial application.

In 1868, Deacon developed a process by which chlorine is produced by direct oxidation of gaseous HCl with $O_2$ in the presence of a $CuCl_2$ catalyst. This process is described by the overall chemical equation

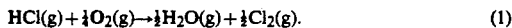
$$HCl(g) + \tfrac{1}{4}O_2(g) \rightarrow \tfrac{1}{2}H_2O(g) + \tfrac{1}{2}Cl_2(g). \tag{1}$$

Reaction (1) in the presence of a $CuCl_2$ catalyst is a fast overall exothermic process, which is expected to reach equilibrium under normal industrial operating conditions of 700° K. to 750° K.

A number of engineering problems are associated with the Deacon process. The temperatures of the process reduce the equilibrium constant for the conversion, resulting in incomplete conversion of the HCl and thereby reducing yield. This is especially a problem when the Deacon process is carried out at a single temperature in a single vessel. Furthermore, at elevated temperatures above 675° K., the catalyst's activity rapidly decreases, mainly because of volatilization of the CuCl.

Since the early 1900's various efforts have been made to improve the Deacon process. Several modifications of the catalyst's composition have been suggested, such as addition of less volatile rare earth metals in the form of chlorides or oxides, and addition of various copper salts, which are promoted by chlorides or oxides of a number of metals such as V, Be, Mg, Bi, and Sb. Several researchers have proposed the addition of NaCl and KCl, which form double salts with the CuCl. These double salts are less volatile than the CuCl itself. $Cr_2O_3$ and $V_2O_5$ have also been shown to be efficient catalysts for the process. However, few, if any, of these modifications have been shown to improve efficiency of the process under actual industrial operating conditions.

Particular modifications of the Deacon process are described in U.S. Pat. No. 2,206,399 to Grosvenor et al., U.S. Pat. No. 2,577,808 to Pye et al., and J. Th. Quant, J. van Dam, W. F. Engel, and F. Wattimena, "The Shell Chlorine Process," *The Chemical Engineer*, 224–232 (1963).

U.S. Pat. No. 2,206,399 to Grosvenor et al. discloses the chlorination and oxidation of a variety of chlorine-carrying multivalent metals, including chromium, cobalt, copper, manganese, nickel, magnesium, and iron. The metal is preferably iron.

U.S. Pat. No. 2,577,808 to Pye et al. discloses the use of iron as a chlorine carrier in a fluidized bed reaction where a granular contact mass including ferric oxide falls by gravity through a heating or cooling zone, and then through a chloridizing zone which has a temperature of 300° C. at the top and 500° C. at the bottom. Thereafter, the chlorine carrier, now in the form of ferric chloride, falls into an oxidizing zone which has a temperature of 500° C. at the top and 550° C. at the bottom to oxidize the particles to ferric oxide. These particles are then returned to the top, cooled, and recycled.

The *Chemical Engineer* article by J. Th. Quant et al. describes a variation of the Deacon process using a Cu catalyst adsorbed on a porous carrier containing alkali metal chlorides and/or lanthanide chlorides, the so-called "Shell catalyst." The reaction is optimally carried out in a fluidized bed.

A number of other processes have been proposed for the recovery of $Cl_2$ from waste HCl. These processes include:

(1) The Kel-Chlor Process. This process involves the reaction of HCl with nitrosylsulfuric acid ($HNSO_5$) contained in a stream of $H_2SO_4$ to produce nitrosyl chloride (NOCl) with eventual production of $Cl_2$ by oxidation of NOCl.

(2) Direct Electrolysis of Hydrochloric Acid.

(3) Direct Oxidation with an Inorganic Oxidizing Agent. Such oxidizing agents include nitrogen dioxide, sulfur trioxide, or a nitric/sulfuric acid mixture. The reaction is carried out in the liquid phase.

(4) Weldon Process. This process is based on the oxidation of aqueous hydrochloric acid with manganese dioxide, with subsequent reconversion of manganous chloride by air blowing in the presence of lime.

None of these processes can be characterized as completely successful. Direct electrolysis of HCl is only exploitable where power costs are low and the recovered co-product, hydrogen, can be made to bear an appropriate share of the manufacturing costs. In the present industrial environment of high and unpredictably fluctuating energy costs, such a process has little use. The processes involving direct oxidation with an inorganic oxidizing agent are very corrosive and give relatively low yields of chlorine. The various two-stage processes, including the Weldon process and variations of the Deacon process, attain far lower conversions under normal industrial operating conditions than are claimed to occur theoretically. Also, catalytic activity decline and loss due to catalyst volatilization still remain severe problems and major components of the final product cost. The Kel-Chlor process is very costly in plant design, safety features, and energy requirements.

Accordingly, there is a need for an efficient process for the preparation of chlorine from HCl that gives a nearly quantitative conversion of HCl to chlorine, operates under conditions in which the catalyst does not volatilize and in which the activity of the catalyst remains stable, and operates at relatively moderate temperatures to prevent corrosion and minimize the extrinsic energy input required.

SUMMARY

We have developed an improved process for producing $Cl_2$ from HCl that remedies defects of previous processes for the production of $Cl_2$. This improved process functionally separates the Deacon process into two steps: Step 1, a chloridizing step; and Step 2, an oxidizing step. A process according to the present invention is operable at moderate temperatures and uses a catalyst that does not volatilize and has a relatively long lifetime under the actual reaction conditions of the process. It gives a high yield of $Cl_2$ and efficient conversion of the HCl to $Cl_2$, and can be practiced using a simple apparatus. It requires only limited input of extrinsic energy, making it economical to operate.

Most generally, the process comprises the steps of:

(1) contacting at an elevated temperature a gas containing HCl with a catalyst comprising:

(a) a transition metal oxide selected from the group consisting of $MnO_2$, $Co_2O_3$, $Co_3O_4$, $Cr_2O_3$, NiO, $Ni_2O_3$, $Mo_2O_3$, CuO, and combinations thereof;

(b) an alkali metal chloride selected from the group consisting of LiCl, NaCl, KCl, and combinations thereof; and (c) optimally, a promoter selected from the group consisting of $LaCl_3$, $PrCl_3$, and $Pr_2O_3$, and combinations thereof, the elevated temperature being sufficiently high, in the range of from about 100° C. to about 300° C., that the transition metal oxide is converted to transition metal chloride by the HCl with elimination of water; and (2) contacting the transition metal chloride generated in step (1) with a source of oxygen at a temperature increased over the temperature of step (1), the temperature being sufficiently high, at least about 300° C. up to about 400° C., that $Cl_2$ is evolved and the transition metal chloride in the catalyst is reconverted to the transition metal oxide for reuse in step (a).

The components are present in the catalyst in a ratio of about 1 mole of alkali metal chloride and up to about 0.2 mole of promoter, if present, per mole of transition metal oxide.

Preferably, the elevated temperature in the first step of the reaction is in the range of from about 100° C. to about 250° C.

In a preferred version of the invention, the transition metal oxide is $MnO_2$, $Co_2O_3$, or $Co_3O_4$, or a combination thereof, most preferably $MnO_2$. In this version, described for convenience with $MnO_2$, the $MnO_2$ is converted to $MnCl_2$ by the HCl and water and $Cl_2$ are evolved in the first step, which preferably occurs at a temperature of from about 100° C. to about 250° C. Preferably, the $MnCl_2$ is contacted with the source of oxygen in the second step at a temperature of from about 350° C. to about 375° C. In this version of the invention, $Cl_2$ is evolved in both steps of the reaction.

In another version of the invention, the transition metal oxide is $Cr_2O_3$, NiO, $Ni_2O_3$, or $Mo_2O_3$, or a combination thereof. In this version, two changes are made from the preferred version. In the first step, the HCl is preferably contacted with the catalyst containing the transition metal oxide at a temperature of from about 100° C. to about 225° C. In the second step, the resulting transition metal chloride is preferably contacted with the source of oxygen at a temperature of from about 310° C. to about 375° C.

In a third version of the invention, the transition metal oxide is CuO. In this version of the invention, the temperature range in the first step is from about 100° C. to about 300° C. The temperature range in the second step is from about 310° C. to about 375° C., preferably from about 310° C. to about 330° C., to prevent volatilization of the copper-containing catalyst.

The catalyst is preferably supported on an inert support. The weight of the catalyst preferably comprises about 10 to about 20 percent of the total weight of the catalyst and the inert support. The inert support is preferably gamma-alumina, pumice, silica, or molecular sieve material.

The source of oxygen for these processes can be $O_2$; the $O_2$ can be diluted with $N_2$. The source of oxygen can be preheated to provide at least some of the necessary heat for the evolution of $Cl_2$ and the reconversion of the transition metal chloride in the catalyst to the transition metal oxide.

The first step of the process can occur in a first reaction zone and the second step in a second reaction zone. In this embodiment, the process comprises the additional step of recycling reconverted transition metal oxide from the second reaction zone to the first reaction zone.

The catalysts for the process of the present invention can be contained in a fluidized bed or a stationary bed. When the process occurs in two separate reaction zones, the catalyst can be contained in a fluidized bed in both reaction zones. In particular, the catalyst can be contained in a first fluidized bed in the first reaction zone and a second fluidized bed in the second reaction zone.

DRAWING

These and other features, aspects, and advantages of the present invention will become better understood from the accompanying description, appended claims, and accompanying drawing where:

The single FIGURE is a schematic diagram of a single-stage reaction vessel usable for the process of the present invention;

DESCRIPTION

An improvement in the Deacon process that we have developed meets the needs of high yield, stability of catalyst activity, and operability at moderate temperatures. This improvement avoids the use of excessively complex apparatus and can be performed using either a stationary or a fluidized bed.

This improvement functionally separates the Deacon process into two steps: Step 1, a chloridizing step; and Step 2, an oxidizing step. This functional separation can be performed either by physically moving the catalyst from one reaction vessel to another, or by cycling the temperature between the optima for each step in a single vessel. In the first of these alternatives, each step of the process is actually performed in a separate reaction vessel whose temperature is controlled independently.

By separating the two steps, we avoid the equilibrium limit on the reaction, we avoid having the corrosive mixture of HCl and $H_2O$ present in the same process stream.

A. Thermodynamic Considerations

There is general agreement that the reaction mechanism of the Deacon process with a Cu catalyst is described by the following overall mechanistic scheme:

$$2CuCl_2(s) \rightarrow 2CuCl(s) + Cl_2(g) \qquad (2)$$

$$2CuCl(s) + \tfrac{1}{2}O_2(g) \rightarrow CuOCuCl_2(s) \qquad (3)$$

$$CuOCuCl_2(s) + 2HCl(g) \rightarrow 2CuCl_2(s) + H_2O(g) \qquad (4)$$

Adding equations (2) and (3), $$2CuCl_2(s) + \tfrac{1}{2}O_2(g) \rightarrow CuOCuCl_2(s) + H_2O(g) \qquad (5)$$

Equations (4) and (5) can be reformulated as follows:

$$CuCl_2(s) + \tfrac{1}{2}O_2(g) \rightarrow CuO(s) + Cl_2(g) \qquad (6)$$

$$CuO(s) + 2HCl(g) \rightarrow CuCl_2 + H_2O(g) \qquad (7)$$

In 1962, Allen, in J. A. Allen, *J. App. Chem. (London)* 12, 406 (1962), suggested that for a metal to be an effective Deacon process catalyst the free energy changes associated with reactions (6) and (7) must be small (approximately zero). Only a limited number of metals satisfies this criterion, and with the exception of Mg, all of these metals have been found to be effective Deacon process catalysts.

We have recently developed a theoretical technique for accurate estimating of the thermodynamic properties of metal-oxy and chloro-hydroxy intermediate compounds. As a result it is now possible to study in detail the thermochemistry of the Deacon process. Based on our knowledge of the thermochemical properties of these intermediate reactive species and after testing thermochemically the validity of a number of alternative mechanistic routes we have proposed the following reaction mechanism for the Deacon process, using a Cu catalyst:

CuO formation:

$$CuCl_2(s) + \tfrac{1}{2}O_2(g) \rightarrow CuO(s) + Cl_2(g) \qquad (6)$$

HCl absorption steps:

$$CuO(s) + HCl(g) \rightarrow Cu(OH)Cl(s) \qquad (8)$$

$$Cu(OH)Cl(s) \rightarrow \tfrac{1}{2}Cu_2OCl_2(s) + \tfrac{1}{2}H_2O(g) \qquad (9)$$

$$\tfrac{1}{2}Cu_2OCl_2(s) \rightarrow \tfrac{1}{2}CuO(s) + \tfrac{1}{2}CuCl_2(s) \qquad (10)$$

Valency change:

$$CuCl_2(s) \rightarrow CuCl(s) + \tfrac{1}{2}Cl_2(g) \qquad (11)$$

Catalyst regeneration:

$$CuCl(s) + \tfrac{1}{2}O_2(g) \rightarrow \tfrac{1}{2}Cl_2(g) + CuO(s) \qquad (12)$$

Since the reaction mechanism of the Deacon process consists of both exothermic and endothermic steps one expects an optimal temperature range for the process, which has been found experimentally. The observation, furthermore, that the true catalyst for the process is a mixture of the oxide and chloride forms of Cu, the oxide form being necessary for HCl adsorption and the chloride form participating in the Cl$_2$ release step, opens new avenues for further engineering optimization in terms of feed composition, pressure and temperature cycling, and adaptive control.

B. Choice of Catalyst

With the thermodynamic factors taken into account, the optimal catalyst in the Deacon process is a variation of the so-called "Shell Catalyst." This catalyst comprises a transition metal oxide, an alkali metal chloride and, optimally, a trivalent rare earth metal chloride or rare earth metal oxide. The trivalent rare earth metal chloride or oxide serves as a promoter and is subsequently referred to by this term.

The transition metal oxide is one of $MnO_2$, $Co_2O_3$, $Co_3O_4$, $Cr_2O_3$, $Mo_2O_3$, $CuO$, $NiO$, or $Ni_2O_3$, or mixtures and combinations thereof.

The alkali metal chloride is preferably LiCl, NaCl, or KCl. Most preferably, it is NaCl or KCl. A mixture of any of these alkali metal chlorides can also be used. The promoter is preferably $LaCl_3$ or $PrCl_3$, but other similar rare earth chlorides, such as $NdCl_3$, or a mixture of $NdCl_3$ and $PrCl_3$, as well as trivalent rare earth metal oxides, such as $Pr_2O_3$, can also be used as the promoter. The alkali metal chloride is typically present in the catalyst at a ratio of about 1 mole of alkali metal chloride per mole of transition metal oxide. The promoter, if present, is at a ratio of up to 0.2 mole per mole of transition metal oxide.

The catalyst is typically supported on an inert support. The inert support is preferably gamma-alumina, pumice, silica, or molecular sieve material. The weight of the catalyst is preferably about 10 percent to about 20 percent of the total weight of the catalyst and the inert support taken together. Typically, the catalyst is incorporated in high-surface-area material, with a surface area of 100–500 m$^2$/g.

C. Reaction with Catalyst Using MnO$_2$

The reaction with a catalyst using MnO$_2$ is exceptional in that Cl$_2$ is released in both steps of the reaction: step 1, the chloridizing step; and step 2, the oxidizing step.

In step 1, the chloridizing step, the catalyst is contacted with a gas containing HCl at a temperature of from about 25° C. to about 250° C., preferably from about 100° C. to about 250° C., more preferably no higher than 225° C. As a result of this contact, the MnO$_2$ is converted into MnCl$_2$, being reduced from a (+4) oxidation state to a (+2) oxidation state. The exit stream of the reaction contains steam and Cl$_2$ according to the equation $$4HCl(g) + MnO_2(s) \rightarrow MnCl_2(s) + 2H_2O(g) + Cl_2(g). \qquad (13)$$

The steam and Cl$_2$ can be easily separated from each other or condensed together and subsequently separated as needed. This step is exothermic, with a $\Delta H$ of $-6$ kcal/mole.

In step 2, the oxidizing step, the chloridized catalyst is then contacted with a source of oxygen at a temperature of at least 300° C. but less than about 400° C. but sufficiently high that Cl$_2$ is evolved and the MnCl$_2$ is reconverted to the original catalytic MnO$_2$ for reuse in the first step. The temperature of step 2 is increased over that of step 1. The temperature is preferably from about 350° C. to about 375° C. at this step. This step is also exothermic with a $\Delta H$ of $-8$ kcal, and takes place according to the equation $$MnCl_2(s) + O_2(g) \rightarrow MnO_2(s) + Cl_2(g). \qquad (14)$$

The source of oxygen in this step can be O$_2$ gas, pure or diluted with N$_2$, or air.

Preferably the source of oxygen is preheated to provide at least some of the necessary heat not provided by the reaction itself for the evolution of Cl$_2$ and the reconversion of MnCl$_2$ to MnO$_2$. Additional heat is required because of the considerable rise in temperature in going from the first step to the second step. Any O$_2$ not consumed can be recycled.

Typically, the pressure of the reaction is close to about 1 atmosphere, but there is no theoretical limit on the pressure, and use of a supra-atmospheric pressure, such as about 10 atmospheres, might be beneficial for the production of chlorine.

$Co_2O_3$ or $Co_3O_4$ can be substituted for $MnO_2$ in this version of this invention.

D. Reaction Using Catalysts Containing Other Metal Oxides

The reaction using catalysts containing metal oxides other than $MnO_2$ proceeds similarly in two steps, except that in the first chloridizing step, no $Cl_2$ is released, only $H_2O$ as steam or water vapor. In the second oxidizing step $Cl_2$ is released.

The temperature limits in the first step are preferably from about 100° C. to about 225° C. if a catalyst containing metal oxides other than CuO is used. If a catalyst containing CuO is used, the optimum temperature for the first step can range from about 100° C. to about 300° C.

If the catalyst does not contain CuO, the temperature of the second step is at least about 300° C. but less than about 400° C., sufficiently high that $Cl_2$ is evolved and the metal chloride is reconverted to a metal oxide for reuse in the first step. The temperature of the second step is increased over that of the first step. More preferably, the temperature in the second step is to be from about 310° C. to about 375° C. If the catalyst does contain CuO, the temperature of the second step should be from about 310° C. to 375° C., more preferably from about 310° C. to about 330° C. The maximum temperature should be limited when the catalyst contains CuO to avoid volatilization of the catalyst.

E. Apparatus for Performing the Reaction

The reaction can be carried out in a simple reaction vessel as shown in FIG. 1.

FIG. 1 shows a reaction vessel suitable for carrying out the two-step process using a catalyst continuing $MnO_2$. The catalyst 10 is contained in the body 12 of the reaction vessel 14. A first inlet 16, controlled by valve 18 admits the HCl-containing gas for the performance of the first, chloridizing, step. A second inlet 20, controlled by valve 22, admits the source of oxygen, such as $O_2$ gas, for the performance of the second, oxidizing step. An outlet 24, controlled by valve 26, allows escape of the effluent gas in each step for further processing. The vessel is surrounded by a temperature control mechanism (not shown) that can supply or remove heat as needed to keep the temperature within the required limits.

Alternatively, the reaction can be carried out in a fixed bed or fluidized bed reactor.

In another, preferred, alternative, the reaction can be carried out in an apparatus in which the first, chloridizing, step occurs in a first reaction zone and the second, oxidizing, step occurs in a second reaction zone. In this alternative, the reaction further comprises the step of recycling reconverted transition metal catalyst from the second reaction zone to the first reaction zone. When two reaction zones are used, a separate fluidized bed can be used to contain the catalyst in each reaction zone.

This invention will be better understood from the following Examples.

EXAMPLES 1-4

Reaction of Metal Oxide Catalysts with HCl and $O_2$

A quartz tube of 15 mm I.D. was packed with glass wool and about 10-12 g of alumina- or silica-supported metal oxide catalyst. The metal oxide content varied between 10 and 20 weight percent of the total weight of the catalyst, including the support. The tube was located in an electrically heated furnace whose temperature was adjustable.

In experiments with HCl, a diluent (Ar or $N_2$, about 20% by volume) was used and the gas mixture was circulated over the catalyst. Water was condensed in a trap cooled in dry ice. The amount of HCl adsorbed could be accurately ($\pm 1\%$) measured from the pressure drop. All experiments were done between 100° C. and 200° C. initial temperature. Rates of adsorption were too fast to measure and no other products besides water and $Cl_2$ were ever observed.

In experiments with $O_2$, the HCl-saturated catalyst was preheated to the desired temperature, usually about 350° C., and $O_2$ circulated over the catalyst until no further $Cl_2$ was deposited in the dry ice trap. Measurements of $Cl_2$ were done by titration and $O_2$ consumption was measured by pressure drop. No products other than $Cl_2$ were ever found in the oxygen experiments.

The following metal oxides were tested:

EXAMPLE 1—CuO

With CuO, HCl was completely absorbed at 150° C. At 315° C., some $Cl_2$ was observed using $O_2$. Much faster reaction occurred at 330°-375° C. At 475° C. $Cl_2$ evolution with $O_2$ was rapid but some CuCl catalyst evaporated outside the oven region.

EXAMPLE 2—NiO

With NiO at 190° C., HCl absorption was rapid and complete. Above 380° C. $Cl_2$ was quickly evolved using $O_2$.

EXAMPLE 3—$MnO_2$

At 100°-250° C. HCl was completely absorbed and both $H_2O$ and $Cl_2$, both condensed, were liberated. The resulting $MnCl_2$ evolved $Cl_2$ slowly from 350° to 400° and then rapidly at about 400° C.

EXAMPLE 4—$V_2O_5$

At 190° C., absorption was complete with only $H_2O$ liberation. On heating the catalyst above 250° C. both $Cl_2$ and a volatile chloride, probably $VO_2Cl$ or $VOCl_3$, were evolved.

All catalysts tested could be reused through a number of cycles of the experiment with the same results.

Based on the above findings and current knowledge of the chemistry of the process we divided metal oxides into four categories:

(1) alkali metal oxides and alkaline earth metal oxides such as $Na_2O$, CaO, or MgO, whose chlorides do not react with $O_2$ below 900° C., and metal oxides such as $Al_2O_3$ that do not react above 100° C. with HCl to form chlorides;

(2) CuO, $Fe_2O_3$, and $V_2O_5$, whose chlorides become volatile at temperatures where the reaction of $O_2$ with the chlorides is rapid;

(3) $MnO_2$ and $Co_2O_3$ or $Co_2O_4$, which produce $Cl_2$ together with $H_2O$ when adsorbing HCl above 100° C.; and (4) $Cr_2O_3$ and NiO, which adsorb HCl completely between 100° C. and 200° C. and whose chlorides react rapidly above 450° C. without forming volatile intermediates.

Oxides from classes (1) and (2), except for CuO, are not suitable for commercial processes. Oxides from classes (3) and (4) are suitable for such processes. All of them can be benefited by mixtures with other oxides from these same categories and/or from mixtures with alkali metal halides which tend to lower the melting points of the chlorides formed in the reaction with HCl and then facilitate the rate of the later reaction with $O_2$.

A process according to the present invention has many advantages. Such a process is commercially useful for the preparation of chlorine from HCl and operates more efficiently than currently used processes by functionally separating the Deacon process into two steps: a chloridizing step and an oxidizing step. The process gives a nearly quantitative conversion of HCl to chlorine and operates under conditions in which the catalyst does not volatilize, and under which the activity of the catalyst remains stable. The process also requires only limited input of extrinsic energy and operates at relatively moderate temperatures and without corrosion of its surroundings.

Although the present invention has been described in considerable detail with regard to certain preferred versions thereof, other versions are possible. Therefore, the spirit and scope of the appended claims should not be limited to the description of the preferred versions contained herein.

What is claimed is:

1. A process for producing $Cl_2$ from HCl, comprising the steps of:
   (a) contacting in a stationary bed and at a chloridizing temperature of between about 25° C. and about 250° C. a gas containing HCl with a catalyst comprising:
      (i.) a transition metal oxide selected from the group consisting of $MnO_2$, $Co_2O_3$, $Co_3O_4$, $Cr_2O_3$, $Ni_2O_3$, $NiO$, $Mo_2O_3$, $CuO$, and combination thereof; and
      (ii.) an alkali metal chloride selected from the group consisting of LiCl, NaCl, KCl, and combinations thereof, in the ratio of about 1 mole of alkali metal chloride per mole of transition metal oxide, the catalyst being supported on an inert support;
   the chloridizing temperature being sufficiently high that the transition metal oxide is converted to transition metal chloride by the HCl and $Cl_2$ is evolved from the HCl with elimination of water; and
   (b) contacting in said stationary bed the transition metal chloride generated in step (a) with a source of oxygen at an oxidizing temperature greater than the chloridizing temperature, the oxidizing temperature being sufficiently high, at least about 300° C., that $Cl_2$ is evolved and the transition metal chloride in the catalyst is reconverted to the transition metal oxide for reuse in step (a).

2. The process of claim 1 wherein the catalyst further comprises a promoter selected from the group consisting of $LaCl_3$, $PrCl_3$, $Pr_2O_3$, and combinations thereof, in the ratio of up to about 0.2 mole of promoter per mole of transition metal oxide.

3. The process of claim 1 wherein the elevated temperature in step (a) is in the range of about 100° C. to about 250° C.

4. The process of claim 1 wherein the insert support is selected from the group consisting of gamma-alumina, pumice, silica, and molecular sieve material.

5. The process of claim 4 wherein the weight of the catalyst comprises about 10 to about 20 percent of the total weight of the catalyst and the inert support.

6. The process of claim 1 wherein the source of oxygen is preheated to provide at least some of the necessary heat for the evolution of $Cl_2$ and the reconversion of the metal chloride in the catalyst to the metal oxide.

7. The process of claim 1 wherein the $O_2$ is diluted with $N_2$.

8. A process for producing $Cl_2$ from HCl, comprising the steps of:
   (a) contacting in a stationary bed at a chloridizing temperature of between about 25° C. and about 250° C. a gas containing HCl with a catalyst comprising:
      (i) a transition metal oxide selected from the group of $MnO_2$, $Co_2O_3$, $Co_3O_4$, and combinations thereof; and
      (ii) an alkali metal chloride selected from the group consisting of LiCl, NaCl, KCl, and combinations thereof, in the ratio of about 1 mole of alkali metal chloride per mole of transition metal oxide, the catalyst being supported on an inert support;
   the chloridizing temperature being sufficiently high that the transition metal oxide is converted to transition metal chloride by the HCl and $Cl_2$ is evolved from the HCl with elimination of water; and
   (b) contacting in said stationary bed the transition metal chloride generated in step (a) with a source of oxygen at an oxidizing temperature greater than the elevated temperature, the oxidizing temperature being sufficiently high, at least about 300° C., that $Cl_2$ is evolved and the transition metal chloride in the catalyst is reconverted to the transition metal oxide for reuse in step (a).

9. The process of claim 8 wherein the catalyst further comprises a promoter selected from the group consisting of $LaCl_3$, $PrCl_3$, $Pr_2O_3$, and combinations thereof, in the ratio of up to about 0.2 mole of promoter per mole of transition metal oxide.

10. The process of claim 8 wherein the weight of the catalyst comprises about 10 to about 20 percent of the total weight of the catalyst and the inert support.

11. The process of claim 8 wherein the weight of the catalyst comprises about 10 to about 20 percent of the total weight of the catalyst and the inert support.

12. The process of claim 8 wherein the source of oxygen is preheated to provide at least some of the necessary heat for the evolution of $Cl_2$ and the reconversion of the metal chloride in the catalyst to the metal oxide.

13. A process for producing $Cl_2$ from HCl, comprising the steps of:
   (a) contacting in a stationary bed at a chloridizing temperature of between about 100° C. and about 250° C. a gas containing HCl with a catalyst comprising:
      (i) $MnO_2$; and
      (ii) an alkali metal chloride selected from the group consisting of LiCl, NaCl, KCl, and combinations thereof in the ratio of about 1 mole of alkali metal chloride per mole of $MnO_2$, the catalyst being supported on an inert support;
   (b) contacting in said stationary bed the $MnCl_2$ generated in step (a) with a source of oxygen at an oxidizing temperature greater than the chloridizing temperature, the oxidizing temperature being sufficiently high, at least about 300° C., that the $Cl_2$ is evolved and the $MnCl_2$ in the catalyst is reconverted to catalytic $MnO_2$ for reuse in step (a).

14. The process of claim 13 wherein the catalyst further comprises a promoter selected from the group consisting of LaCl$_3$, PrCl$_3$, Pr$_2$O$_3$, and combinations thereof, in the ratio of up to about 0.2 mole of promoter per mole of MnO$_2$.

15. The process of claim 13 wherein the MnCl2 generated in step (a) is contacted with the source of oxygen at a temperature of from about 350° C. to about 375° C.

16. The process of claim 13 wherein the weight of the catalyst comprises about 10 to about 20 percent of the total weight of the catalyst and the inert support.

17. The process of claim 13 wherein the source of oxygen is preheated to provide at least some of the necessary heat for the evolution of Cl$_2$ and the reconversion of the metal chloride in the catalyst to the metal oxide.

18. A process for producing Cl$_2$ from HCl, comprising the steps of:
    (a) contacting in a stationary bed at a chloridizing temperature of between about 25° C. and about 250° C. a gas containing HCl with a catalyst comprising:
        (i) a transition metal oxide selected from the group consisting of Cr$_2$O$_3$, Nihd 2O$_3$, NiO, MO$_2$O$_3$, and combinations thereof; and
        (ii) an alkali metal chloride selected from the group consisting of LiCl, NaCl, and KCl, and combinations thereof in the ratio of about 1 mole of alkali metal chloride per mole of transition metal oxide, the catalyst being supported on an inert support;
    the chloridizing temperature being sufficiently high that the transition metal oxide is converted to a transition metal chloride by the HCl with elimination of water; and
    (b) contacting in said stationary bed the transition metal chloride generated in step (a) with a source of oxygen at an oxidizing temperature greater than the chloridizing temperature, the oxidizing temperature being sufficiently high, at least about 300° C., that Cl$_2$ is evolved and the transition metal chloride in the catalyst is reconverted to the transition metal oxide for reuse in step (a).

19. The process of claim 18 wherein the catalyst further comprises a promoter selected from the group consisting of LaCl$_3$, PrCl$_3$, Pr$_2$O$_3$, and combinations thereof, in the ratio of up to about 0.2 mole of promoter per mole of transition metal oxide.

20. The process of claim 18 wherein the transition metal chloride generated in step (a) is contacted with the source of oxygen at a temperature of from about 310° C. to about 375° C.

21. The process of claim 18 wherein the weight of the catalyst comprises about 10 to about 20 percent of the total weight of the catalyst and the inert support.

22. The process of claim 18 wherein the source of oxygen is preheated to provide at least some of the necessary heat for the evolution of Cl$_2$ and the reconversion of the metal chloride in the catalyst to the metal oxide.

23. A process for producing Cl$_2$ from HCl, comprising the steps of:
    (a) contacting in a stationary bed at a chloridizing temperature of between about 25° C. and about 250° C. a gas containing HCl with a catalyst comprising:
        (i) CuO; and
        (ii) an alkali metal chloride selected from the group consisting of LiCl, NaCl, KCl, and combinations thereof in the ratio of about 1 mole of alkali metal chloride per mole of CuO, the catalyst being supported on an inert support;
    the chloridizing temperature being sufficiently high that the CuO is converted to CuCl$_2$ by the HCl with elimination of water; and
    (b) contacting in said stationary bed the CuCl$_2$ generated in step (a) with a source of oxygen at an oxidizing temperature, the oxidizing temperature being sufficiently high, from about 310° C. to about 375° C., that Cl$_2$ is evolved and the CuCl$_2$ in the catalyst is reconverted to CuO for reuse in step (a).

24. The process of claim 23 wherein the catalyst further comprises a promoter selected from the group consisting of LaCl$_3$, PrCl$_3$, Pr$_2$O$_3$, and combinations thereof, in the ratio of up to about 0.2 mole of promoter per mole of CuO.

25. The process of claim 23 wherein the chloridizing temperature in step (a) is in the range of about 100° C. to about 250° C.

26. The process of claim 23 wherein the CuCl$_2$ generated in step (a) is contacted with the source of oxygen at a temperature of from about 310° C. to about 330° C.

27. The process of claim 23 wherein the weight of the catalyst comprises about 10 to about 20 percent of the total weight of the catalyst and the inert support.

28. The process of claim 24 wherein the source of oxygen is preheated to provide at least some of the necessary heat for the evolution of Cl$_2$ and the reconversion of the metal chloride in the catalyst to the metal oxide.

* * * * *